US009068731B2

(12) United States Patent
Hermitte et al.

(10) Patent No.: US 9,068,731 B2
(45) Date of Patent: Jun. 30, 2015

(54) AUTOMOBILE LIGHTING OR SIGNALING DEVICE

(75) Inventors: Michel Hermitte, Angers (FR); Nicolas Come, La Fleche (FR); Jérôme Chiron, Tierce (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 13/290,343

(22) Filed: Nov. 7, 2011

(65) Prior Publication Data

US 2012/0113659 A1 May 10, 2012

(30) Foreign Application Priority Data

Nov. 8, 2010 (FR) ....................................... 1059198

(51) Int. Cl.

| | |
|---|---|
| ***B60Q 1/00*** | (2006.01) |
| ***F21V 29/00*** | (2015.01) |
| ***F21S 8/10*** | (2006.01) |
| ***F21V 17/10*** | (2006.01) |
| ***F21V 19/00*** | (2006.01) |
| *F21Y 101/02* | (2006.01) |

(52) U.S. Cl.

CPC ............. *F21V 29/004* (2013.01); *F21S 48/155* (2013.01); *F21S 48/212* (2013.01); *F21S 48/215* (2013.01); *F21S 48/2225* (2013.01); *F21S 48/255* (2013.01); *F21V 17/10* (2013.01); *F21V 17/101* (2013.01); *F21V 19/001* (2013.01); *F21Y 2101/02* (2013.01); *F21S 48/2206* (2013.01); *F21S 48/321* (2013.01)

(58) Field of Classification Search

USPC ......... 362/487, 540, 541, 542, 545, 547, 548, 362/549, 249.02, 217.03, 225, 217.1, 362/217.11, 217.14, 217.15, 235, 23.03, 362/23.05, 23.07, 23.16

See application file for complete search history.

(56) References Cited

U.S. PATENT DOCUMENTS

| | | | | |
|---|---|---|---|---|
| 5,276,937 | A * | 1/1994 | Lan | 15/257.01 |
| 5,673,995 | A * | 10/1997 | Segaud | 362/545 |
| 6,015,223 | A * | 1/2000 | Kidd et al. | 362/503 |
| 6,921,184 | B2 * | 7/2005 | Tufte | 362/368 |
| 7,055,987 | B2 | 6/2006 | Staufert | |
| 7,163,327 | B2 * | 1/2007 | Henson et al. | 362/554 |
| 7,360,924 | B2 | 4/2008 | Henson et al. | |
| 7,374,322 | B2 * | 5/2008 | Steen et al. | 362/487 |
| 7,407,307 | B2 * | 8/2008 | Hiratsuka | 362/304 |
| 7,658,526 | B2 | 2/2010 | Henson et al. | |
| 7,731,400 | B2 | 6/2010 | Dubosc et al. | |
| 7,959,326 | B2 | 6/2011 | Laporte | |
| 8,002,435 | B2 | 8/2011 | Laporte | |
| 8,070,336 | B2 | 12/2011 | Dubosc et al. | |

(Continued)

FOREIGN PATENT DOCUMENTS

| | | |
|---|---|---|
| DE | 10232894 | 7/2002 |
| DE | 20211199 | 12/2003 |

(Continued)

*Primary Examiner* — Sharon Payne
*Assistant Examiner* — Naomi M Wolford
(74) *Attorney, Agent, or Firm* — Jacox, Meckstroth & Jenkins

(57) ABSTRACT

An automobile vehicle lighting and/or signaling device comprising an assembly of parts comprising a first part having a closed contour or an open contour, and a joining member with a first adhesive side that receives the first part so that after sticking the first part to the joining member the adhesive side has a free region adjacent the contour of the part.

12 Claims, 3 Drawing Sheets

(56) References Cited

U.S. PATENT DOCUMENTS

| | | | | |
|---|---|---|---|---|
| 8,128,265 | B2 * | 3/2012 | Shamitz et al. | 362/497 |
| 8,287,150 | B2 * | 10/2012 | Schaefer et al. | 362/249.02 |
| 8,314,433 | B2 * | 11/2012 | Christy | 257/88 |
| 2004/0114392 | A1 * | 6/2004 | Hou | 362/545 |
| 2004/0149998 | A1 | 8/2004 | Henson et al. | |
| 2004/0233671 | A1 | 11/2004 | Staufert | |
| 2005/0169002 | A1 | 8/2005 | Steen et al. | |
| 2007/0103925 | A1 | 5/2007 | Henson et al. | |
| 2008/0019139 | A1 | 1/2008 | Dubosc et al. | |
| 2008/0180014 | A1 * | 7/2008 | Tzeng et al. | 313/46 |
| 2008/0253140 | A1 * | 10/2008 | Fleischmann et al. | 362/487 |
| 2009/0059614 | A1 | 3/2009 | Henson et al. | |
| 2009/0310356 | A1 * | 12/2009 | Laporte | 362/239 |
| 2010/0238675 | A1 | 9/2010 | Dubosc et al. | |
| 2010/0271829 | A1 | 10/2010 | Laporte | |

FOREIGN PATENT DOCUMENTS

| | | |
|---|---|---|
| DE | 20300472 | 5/2004 |
| EP | 1881263 | 1/2008 |
| WO | 03/023857 | 3/2003 |

* cited by examiner

AUTOMOBILE LIGHTING OR SIGNALING DEVICE

CROSS-REFERENCE TO RELATED APPLICATIONS

This application claims priority to French Application No. 1059198 filed Nov. 8, 2010, which application is incorporated herein by reference and made a part hereof.

BACKGROUND OF THE INVENTION

1. Field of the Invention

The invention concerns in particular an automobile vehicle lighting and/or signaling device.

2. Description of the Related Art

When assembling a device, in particular an automobile vehicle lighting and/or signaling device, it is easier to pre-assemble some parts into an assembly of parts, before final assembly of that assembly to other parts to produce the device. This pre-assembly facilitates handling of these parts before final assembly, in particular in the casing of the automobile vehicle lighting and/or signaling device.

Thus, a part may initially be received by an adhesive before being stuck to an additional part. For example, a printed circuit card may have one side coated with a double-sided adhesive before the other side of the adhesive is stuck to a heat sink. When an additional part must be fixed to this component, other fixing means must often be used, such as clipping means or screwing means. This therefore necessitates an additional operation.

There is a requirement to facilitate assembly, in particular pre-assembly, of parts.

There is, therefore, a need to provide an improved device and means for assembling these parts.

SUMMARY OF THE INVENTION

The invention provides an automobile vehicle lighting and/or signaling device comprising an assembly of parts, the assembly of parts comprising:

a first part having a closed contour or an open contour; and a joining member with a first adhesive side that receives the first part so that after sticking the first part to the joining member the adhesive side has a free region adjacent the contour of said the part.

One object of one embodiment is to provide an improved device and means for assembling parts.

Another object is to provide a system, device and method for adapting a first part to receive a second part.

Thus the joining member has a region stuck to the first part and a free region that is not stuck to that first part. This free region thus offers free access to an additional part that could be stuck to this free region. Thus the additional part is easily fixed, in particular pre-assembled, without having to use other fixing means, such as clipping means or screwing means. It is therefore easier to pre-assemble some parts into an assembly of parts before the final assembly of that assembly to other parts to produce the automobile vehicle lighting and/or signaling device.

The above contour may be open and concave, such as a notch, thereby delimiting a sticking area.

This contour is preferably closed, so that the contour forms a hole through the first part. Thus the free region is accessible through the first part via this hole. Thus there may be a first part pre-stuck to the joining member, that can be manipulated more easily before sticking the additional part. Moreover, the free region is surrounded and thus protected by the walls of the hole. This free region being at the bottom of this hole, it is more difficult for unwanted objects, such as dust, to stick to it before and after fixing the additional part.

The device of the invention may also have one or more of the following complementary features:

this device comprises a second part, the joining member being positioned between the first part and the second part, the joining member comprising a first adhesive side stuck to the first part and a second side fixed to the second part; there is thus obtained a pre-assembly of two parts that is easy to manipulate and includes the free region, enabling the addition of an additional part; the joining member is preferably a double-sided adhesive tape, the second side being stuck to the second part;

the second part is a heat dissipator, in particular a heat sink; this makes it possible in particular to evacuate heat from the first part;

the second part is arranged in such a manner as to allow the guide member to pass through the joining member; the second part preferably has a hole through it facing the closed or open contour of the first part;

the assembly of parts further comprises an additional part, the additional part comprising a surface stuck to the free region; the assembly of the assembly of parts and the additional part is facilitated, as it remains only to stick the additional part to the assembly at the level of the free region; the additional part preferably comprises a guide member comprising the surface stuck to the free region, thus enabling more accurate sticking of the additional part to the first part;

the guide member passes through the joining member; the joining member preferably has portions stuck along the guide member; the guide member preferably passes through the joining member after tearing of the latter in its free region;

the joining member has a pre-piercing hole in its free region, the diameter of which is less than the section of the guide member in a plane containing this pre-piercing hole; this facilitates tearing of the joining member. As well as or instead of this, the guide member may have a shape such as a pointed shape;

the additional part is an optical part; this optical part deviates light rays in particular to form a particular light beam such as a lighting and/or signaling beam in the case of a lighting and/or signaling device; this optical part may be a reflector or a lens or a light guide; the optical part is preferably a light guide; it will then be easy to adjust the optical surfaces (reflecting surfaces or diopters) of the optical part relative to the assembly of parts, in particular relative to light sources carried by that assembly of parts;

the first part comprises a printed circuit;

the lighting and/or signaling device further comprises light-emitting diodes fixed to this printed circuit; and the joining member is an adhesive tape, preferably a thermal adhesive tape.

The invention also provides an assembly of parts comprising:

a first part carrying at least one light source;

an optical part adapted to deviate light rays from the light source; and a joining member positioned between the support part and the optical part, the joining member comprising a first side fixed to the support part and a second side stuck to the optical member, this second side being an adhesive side.

In one aspect, one embodiment of the invention comprises an automobile vehicle lighting and/or signaling device comprising an assembly of parts, the assembly of parts comprising a first part having a closed contour or an open contour and a joining member with a first adhesive side that receives the first part so that after sticking the first part to the joining member, the first adhesive side has a free region adjacent the closed contour or the open contour of the first part.

In another aspect, another embodiment of the invention comprises an assembly of parts comprising a first part carrying at least one light source, an optical part adapted to deviate light rays from the at least one light source and a joining member positioned between a support part and the optical part, the joining member comprising a first side fixed to the first part and a second side stuck to the optical part, the second side being an adhesive side.

According to the invention, this facilitates pre-assembly of a part carrying light sources and a light guide. This enables accurate positioning of the optical part relative to the light sources.

The optical part is preferably a light guide. The light sources are preferably light-emitting diodes. In one embodiment, the side of the first part that is stuck to the joining member is the side that faces the optical member.

This assembly may have the same features as the assembly of parts of the lighting and/or signaling device of the invention described above.

The invention further provides a lighting and/or signaling device comprising the assembly of parts described above.

The invention will be better understood on reading the following detailed description of non-limiting embodiments of the invention and examining the appended drawings, in which:

BRIEF DESCRIPTION OF THE ACCOMPANYING DRAWINGS

DETAILED DESCRIPTION OF THE PREFERRED EMBODIMENTS

Figure 1:
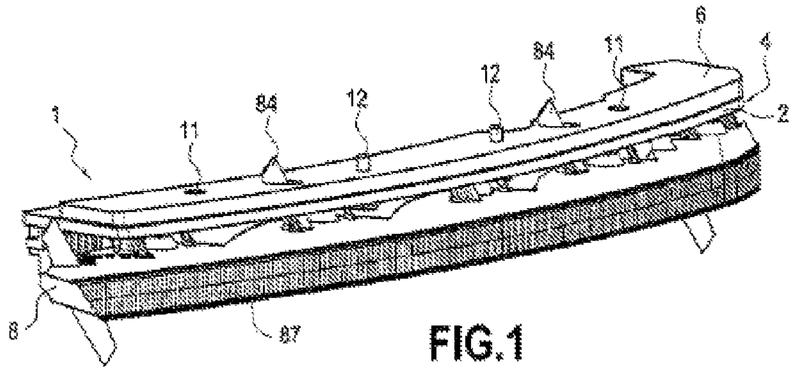
FIG. 1 shows an assembly of parts for a lighting and/or signaling device of the present invention assembled in accordance with a first embodiment of the present invention.

FIGS. 1 to 6C show an assembly of parts 1 intended to be placed in the casing of an automobile vehicle lighting and/or signaling device.

In the first embodiment shown in FIGS. 1 to 4 the assembly of parts comprises:

a first part 2 having a closed contour 21; and a joining member 4 with a first adhesive side that receives the first part 2, so that after sticking the first part 2 to the joining member 4 the adhesive side has a free region 43 (FIG. 4) adjacent the contour 21 of the first part 2.

Figure 2:
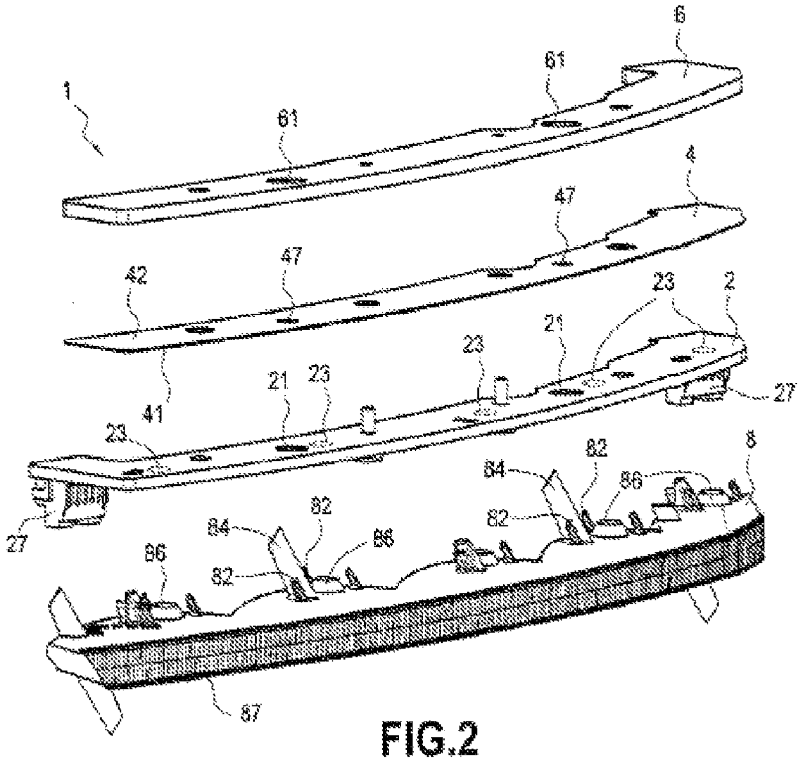
FIG. 2 is an exploded view corresponding to FIG. 1.

In the example shown, this first part is a printed circuit card 2. It comprises connectors 27 adapted to receive an electrical power supply for light-emitting diodes 23 which in FIG. 2 are on the lower side of the printed circuit card 2 and face downward.

In this example, the joining member is a double-sided adhesive tape 4. This adhesive tape 4 is positioned between the printed circuit card 2 and a second part 6, the adhesive tape 4 having a first adhesive side 41 stuck to the card 2 and a second adhesive side 42 stuck to the second part 6. In this example, the second part is a heat dissipator 6 for dissipating heat generated by the electronic circuit card, notably by the LEDs 23. This adhesive tape 4 preferably comprises a thermal adhesive and transfers heat between the card 2 and the dissipator 6.

Here this dissipator 6 takes the form of a metal plate. As shown, the thermal bridge may be completed by thermal screws 12 joining the card 2 and the dissipator 6.

In this embodiment, the contour is closed so that it forms a hole 21 through the first part 2, the free region 43 being accessible through the first part via this hole 21.

This assembly of parts is easy to manipulate and may be transported before being fixed to an optical part, the edges of the hole protecting the free region 43.

In the example shown, the additional part is an optical part. In the example shown, and in a manner that is not limiting on the invention, the optical part is a light guide 8 having entry areas 86 into the guide for light rays emitted by the light sources 23. In this guide 8 light rays propagate as far as an exit face 87 by virtue of one or more internal reflections. An example of a light guide that may be used with the present invention is shown in particular in the application EP 1 881 263, which is equivalent to U.S. Pat. No. 7,731,400 and to U.S. Publication Nos. 2008/019139 and 2010/0238675, all of which are incorporated herein by reference and made a part hereof. In this example, the light rays leaving via the exit face 87 form a lighting and/or signaling beam.

The optical part comprises one or more guide members 84 comprising a surface 85 stuck to the free region 43. In this example, the guide member 84 is an extension of the light guide extending toward the card 2 from the side of the guide 8 facing the card 2. More specifically, the guide member 84 passes through the free region 43.

To fix the optical guide 8 to the card 2 and to the heat dissipator 6, the guide 8 is moved toward the card so that the guide member 84 tears the free region 43 of the adhesive tape 4.

Pins 82 of the guide 8, preferably molded in one piece with the guide 8, have an end 83 in contact with the card 2 once the guide 8 and the card 2 have been assembled. In this example, these pins 82 serve as stops enabling the card 2 to be held at a distance from the guide 8 and stopping movement of the guide member 84 through the adhesive tape 4 during assembly.

When it tears the adhesive tape 4, the guide member 84 entrains portions 44 and 45 of the adhesive tape 4 that remain attached to the tape 4 but extend along the guide member 84 in the direction in which it penetrates the adhesive tape 4. This makes it possible to increase the size of the portion of the area of the free region 43 stuck to the guide member 84. Also, the guide member 84 is in this way gripped by the adhesive tape 4. The pre-assembly is thus stronger and more reliable.

Figure 3:
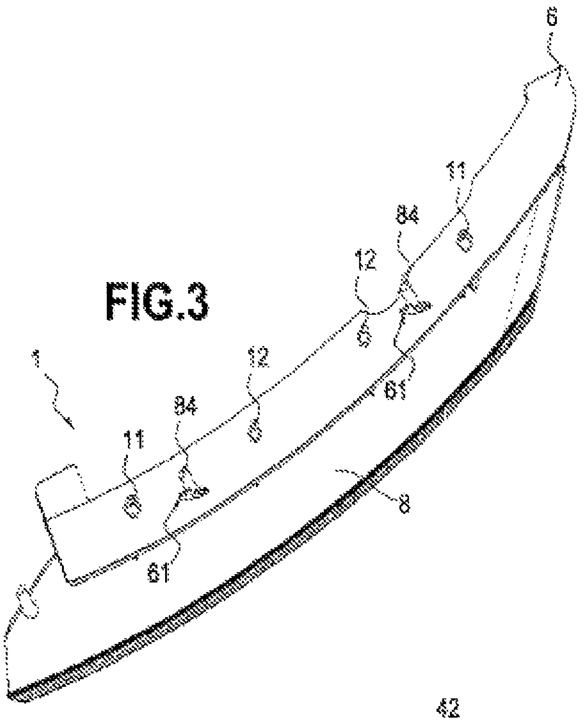
FIG. 3 is a view from above corresponding to FIG. 1.

The optical part may comprise a plurality of guide members 84, as shown in FIGS. 1 to 3.

The heat sink is adapted to allow the guide member 84 to pass through it. For example, it comprises a hole 61 facing the through-hole 21.

The adhesive tape 4 may equally feature a pre-piercing hole in its free region 43 having a diameter that is less than the section of the guide member 84 in a plane containing this pre-piercing hole 47. This facilitates tearing of the adhesive tape 4. Also, the guide member 84 may have a shape such as a pointed shape. The adhesive tape 4 then need not have a pre-piercing hole, the point enabling tearing.

Once assembled, the assembly 1 may be fixed into the casing of the lighting and/or signaling device, for example by screws passing through orifices 11 in the assembly.

Figure 5:
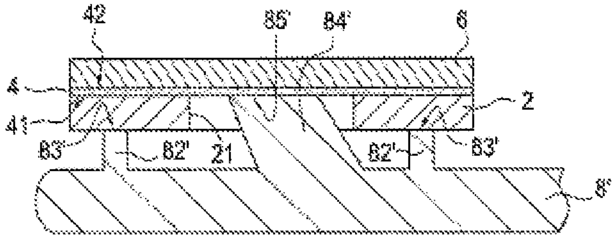
FIG. 5 shows a second embodiment of the invention.

The second embodiment, shown in FIG. 5, differs from the first embodiment in that the guide member 84' does not pass through the joining member 4. Here the guide member comprises a surface 85', in particular a plane surface, that simply bears on the free region 43 through the through-hole 21. This guide member 84' is such that, when it is stuck to the free region 43, the ends 83' of the abutments 82' of the light guide 8' are in contact with the printed circuit card 2. These abutments may be identical to those of the first embodiment. Here the guide member 84' thus serves also as an abutment and maintains the card 2 and the guide 8 at a given distance. The heat dissipator 6 does not require an orifice facing the contour, here the through-hole 21.

Figure 6A:
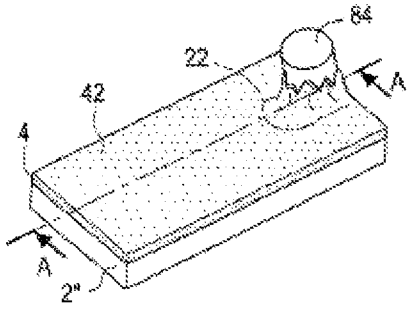
FIG. 6A shows a third embodiment of the invention, seen in perspective.
Figure 6B:
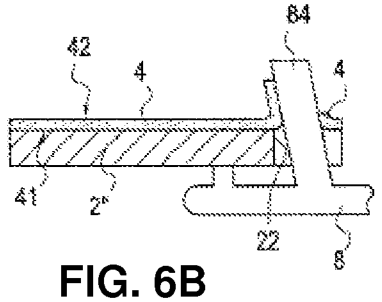
FIG. 6B shows a section corresponding to FIG. 6A taken along the line A-A in FIG. 6.
Figure 6C:
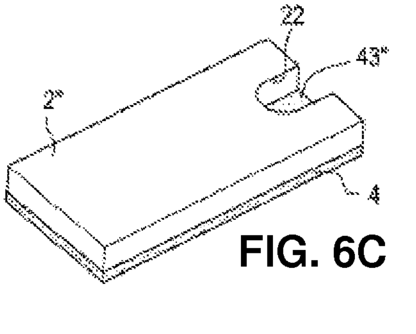
FIG. 6C is a view from below corresponding to FIG. 6A.
Figure 4:
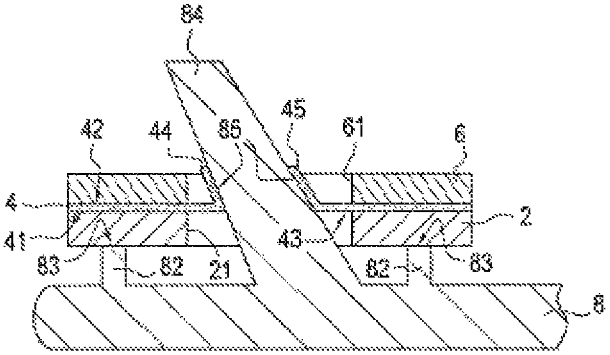
FIG. 4 shows a section through a guide member in the device from FIG. 1.

The third embodiment, shown in FIGS. 6A to 6C, differs from the first embodiment in that the contour 22 is not a closed contour. In this example, this contour is concave and forms a notch, allowing free access to the free region 43" for fixing the optical part 8 by means of its guide member 8. Note that in a variant, not shown, of this third embodiment, the guide member may not tear the junction member 4, simply coming to bear against the free region, as described for the second embodiment.

In FIG. 6C, the optical part 8 is not shown in order to show the first part 2" and its contour 22 allowing access to the free region 43". Similarly, for greater clarity, no heat dissipator is shown. The latter may be added and stuck to the second side 42 of the adhesive tape.

Figure 7:
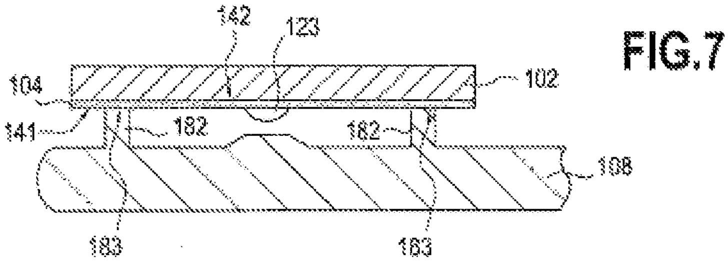
FIG. 7 shows in section a fourth embodiment.

FIG. 7 shows a fourth embodiment. It shows an assembly of parts comprising:

a first part 102, such as a printed circuit card, carrying at least one light source 123, in this example an LED;

an optical part 108, here a light guide, for example as described above, adapted to deviate light rays from the light source 123; and a joining member 104 positioned between the support part and the optical part, said joining member having a first side 142 fixed to the first part 102 and a second side 141 stuck to the light guide 8, this second side being an adhesive side. This joining member is a double-sided adhesive tape, for example, as shown here.

More specifically, the second side 141 of the adhesive tape 104 is stuck to the end surfaces 183 of the positioning members 182, such as pins. These pins hold the guide 108 at a particular distance from the card 102. The adhesive tape 4 passes alongside or around the LED 123 in order not to cover it.

Unlike the other embodiments, the side of the card 102 that is stuck to the adhesive tape 104 is the side that faces the optical member 108. This embodiment is particularly advantageous if there is no need to fix a heat sink to the card 102.

While the system and apparatus herein described constitute preferred embodiments of this invention, it is to be understood that the invention is not limited to this precise system and apparatus, and that changes may be made therein without departing from the scope of the invention which is defined in the appended claims.

What is claimed is:

1. An automobile vehicle lighting or signaling device comprising an assembly of parts, said assembly of parts comprising:

a first part having a closed contour or an open contour;

a joining member with a first adhesive side that receives said first part so that after sticking said first part to said joining member, said first adhesive side has a free region adjacent said closed contour or said open contour of said first part, said joining member also having a second adhesive side for receiving a second part; and an optical part having a guide member;

wherein said free region is a portion of the first adhesive side that is exposed to a hole or opening defined by said closed contour or said open contour and that is accessible through said first part via said closed contour or said open contour and wherein said guide member is received in said hole or opening defined by said closed contour or said open contour so that said guide member engages and pierces through said free region;

said joining member being positioned between said first part and said second part, said joining member comprising said first adhesive side adhered to said first part and said second adhesive side adhered to said second part;

wherein said first part is a printed circuit board and said second part is a heat sink, said first adhesive side of said joining member adhering to said printed circuit board and said second adhesive side adhering to said heat sink;

said guide member of said optical part being received in said hole or opening and engaging said first adhesive side and piercing through said joining member such that a portion of said first adhesive side is adhered to a surface of said guide member in order to secure said optical part to said printed circuit board.

2. The automobile vehicle lighting or signaling device according to claim 1, wherein said open contour is open and concave.

3. The automobile vehicle lighting or signaling device according to claim 2, wherein said open contour is a notch.

4. The automobile vehicle lighting or signaling device according to claim 1, wherein said closed contour is closed so that said closed contour forms a hole through said first part, said free region being accessible through said first part via said hole.

5. The automobile vehicle lighting or signaling device according to claim 1, wherein said surface is a side surface.

6. The automobile vehicle lighting or signaling device according to claim 5, wherein said optical part is a light guide.

7. The automobile vehicle lighting or signaling device according to claim 1, wherein said guide member includes an elongated post.

8. The automobile vehicle lighting or signaling device according to claim 1, wherein said optical part is a light guide.

9. The automobile vehicle lighting or signaling device according to claim 1, wherein said assembly of parts further comprises light-emitting diodes fixed to said printed circuit board.

10. The automobile vehicle lighting or signaling device according to claim 1, wherein said joining member is an adhesive tape.

11. The automobile vehicle lighting or signaling device according to claim 10, wherein said adhesive tape, is a thermal adhesive tape.

12. The automobile vehicle lighting or signaling device according to claim 1, wherein said joining member is double-sided adhesive tape.

* * * * *